United States Patent [19]
Sullivan et al.

[11] Patent Number: 5,349,986
[45] Date of Patent: Sep. 27, 1994

[54] VALVE MECHANISM FOR AN ACOUSTIC MODULATOR

[75] Inventors: James L. Sullivan, Ventura; Gary S. Borgen, Camarillo, both of Calif.

[73] Assignee: The United States of America as represented by the Secretary of the Navy, Washington, D.C.

[21] Appl. No.: 112,814

[22] Filed: Aug. 23, 1993

[51] Int. Cl.$^5$ .................. F16K 31/08; F16K 3/26; H04R 9/00
[52] U.S. Cl. .................. 137/625.33; 251/65; 251/129.01; 251/129.05; 251/905
[58] Field of Search .............. 137/625.33; 251/129.01, 251/129.05, 65, 905

[56] References Cited
U.S. PATENT DOCUMENTS

5,054,522 10/1991 Kowanz et al.
5,893,655 1/1990 Anderson.

*Primary Examiner*—Arnold Rosenthal
*Attorney, Agent, or Firm*—David S. Kalmbaugh; Melvin J. Sliwka; John L. Forrest, Jr.

[57] ABSTRACT

A valve mechanism for an acoustic modulator which modulates air flowing through the acoustic modulator. The valve mechanism comprises a pair of cylindrical shaped members with each member having a plurality of elongated ports. The first cylindrical shaped member is held in a fixed position, while the second cylindrical shaped member is movable with respect to the first member. There is located at the lower end of the second cylindrical shaped member a drive coil which is positioned in a magnetic field such that when the coil is excited by an electrical sinusoidal input signal, movement of the second member occurs, partially aligning the ports of the second member with the ports of the first member which opens the valve mechanism. The sinusoidal input signal causes a frequency "doubling" to occur, that is the valve mechanism of the present invention completes an open-close-open-close cycle during each cycle of the sinusoidal input signal. This frequency "doubling" modulation of air flow through the acoustic modulator is accomplished by exposing the same open port area for both the positive going portion and the negative going portion of the sinusoidal input signal. The valve mechanism "closes" when the sinusoidal input signal is at zero volts.

2 Claims, 6 Drawing Sheets

VALVE MECHANISM FOR AN ACOUSTIC MODULATOR

BACKGROUND OF THE INVENTION

1. Field of the Invention

This invention relates generally to electro-mechanical modulators and, in particular, this invention relates to a valve mechanism for an acoustic modulator which modulates air flow passing through the valve at a selected frequency.

2. Description of the Prior Art

In the prior art there are many types of electro-mechanical modulators and choppers which regulate air flow at a selected frequency. One type of prior art electro-mechanical is an acoustic modulator which regulates air flow by creating air pressure variations which creates acoustic energy having a predetermined frequency. This acoustic energy may then be used to conduct noise and vibration testing on both civilian and military aircraft, missiles and other weapons systems.

The functioning part of the acoustic modulator is the valve mechanism. Prior art valve mechanisms generally use a pair of cylindrical shaped members, each member of which has a plurality of ports which when aligned allow pressurized air to pass therethrough. The first cylindrical shaped member is generally stationary and the second member, which is electro-magnetically exited, moves relative to the first member. An electrical sinusoidal input signal is provided to a coil which is positioned within a magnetic field and secured to the second member. This sinusoidal input signal excites the coil causing the ports of the second member to first align with the ports of the first member and then move out of alignment with the ports of the first member. This movement of the second member relative to the first member first increases air flow and then decreases air flow through the valve mechanism of the acoustic modulator which results in the acoustic modulator providing air pressure variations having a frequency equal to the frequency of the sinusoidal input signal.

Unfortunately, this prior art acoustic modulator consumes excessive air at partial modulation levels which is costly, provides excessive background noise and has a frequency response limitation of between 800 and 1000 hertz which is not an optimum desired frequency for vibration testing of military aircraft and the like.

A second prior art acoustic modulator used for testing purposes has a double valve mechanism of the type disclosed in U.S. Pat. No. 4,893,655 which issued Jan. 16, 1990. The double valve mechanism of U.S. Pat. No. 4,893,655 includes a pair of cylindrical shaped members with each cylindrical shaped member having a plurality of elongated ports. Electro-magnetic excitation causes the cylindrical shaped members to move relative to each other which causes the ports of the members to first align opening the valve and then move out of alignment closing the valve, thereby modulating air flow through the acoustic modulator. Linear motion of both cylindrical shaped members of the valve mechanism is only one half that of prior art valve mechanisms resulting in an acoustic output wave front which is twice the frequency of an electrical sinusoidal input signal supplied to the modulator.

While the valve mechanism of U.S. Pat. No. 4,893,655 provides a significant improvement in the frequency of modulation (approximately 2000 hertz) of air flowing through the modulator, this valve mechanism has a complex design, is expensive and is susceptible to failure because of the movement of both cylindrical shaped members of the valve mechanism.

With the disadvantages inherent in the design of prior art valve mechanisms for acoustic modulators, including those mentioned above, the present invention was conceived and one of its objects was to provide a valve mechanism for an acoustic modulator which modulates air flowing through the modulator at a frequency similar to that of the valve mechanism disclosed in U.S. Pat. No. 4,893,655.

Another object of the present invention is to provide a valve mechanism for acoustic modulators which is simplistic in design, highly efficient and still provides for a frequency of modulation approaching that of complex valve mechanisms such as the valve mechanism of U.S. Pat. No. 4,893,655.

These and other objects, advantages and novel features of the present invention will become more apparent from the detailed description of the preferred embodiment of the invention when considered in conjunction with the accompanying drawings.

SUMMARY OF THE INVENTION

The subject invention overcomes some of the disadvantages of prior art valve mechanism for acoustic modulators in that it comprises a relatively simple yet highly efficient valve mechanism for an acoustic modulator which modulates air flowing through the acoustic modulator. The valve mechanism includes a pair of cylindrical shaped members with each member having a plurality of elongated valve ports. The first cylindrical shaped member of the valve mechanism is held in a fixed position, while the second cylindrical shaped member is movable with respect to the first member. There is located at the lower end of the second cylindrical shaped member a drive coil which is positioned in a magnetic field such that when the coil is excited by an electrical signal, movement of the second member occurs, partially aligning the ports of the second member with the ports of the first member which opens the valve mechanism.

A sinusoidal input signal applied to the drive coil of the second cylindrical shaped member causes a frequency "doubling" to occur, that is the valve mechanism of the present invention completes an open-close-open-close cycle during each cycle of the sinusoidal input signal. This frequency "doubling" modulation of air flow through the acoustic modulator is accomplished by exposing the same open port area for both the positive going portion and the negative going portion of the sinusoidal input signal. The valve mechanism "closes" when the sinusoidal input signal is at zero volts.

The enhanced performance of the valve mechanism of the present invention is achieved by increasing the number of open slots when the second cylindrical shaped member is moved in either in an upward or downward direction, while current requirements for the valve mechanism remain the same because of the size of the slots and the placement planes for the slots within the first and second cylindrical shaped members.

DETAILED DESCRIPTION OF THE PREFERRED EMBODIMENT

The preferred embodiment of the present invention will now be discussed in some detail in conjunction with all of the figures of the drawings wherein like parts are designated by like reference numerals insofar as it is possible and practical to so.

Figure 1:
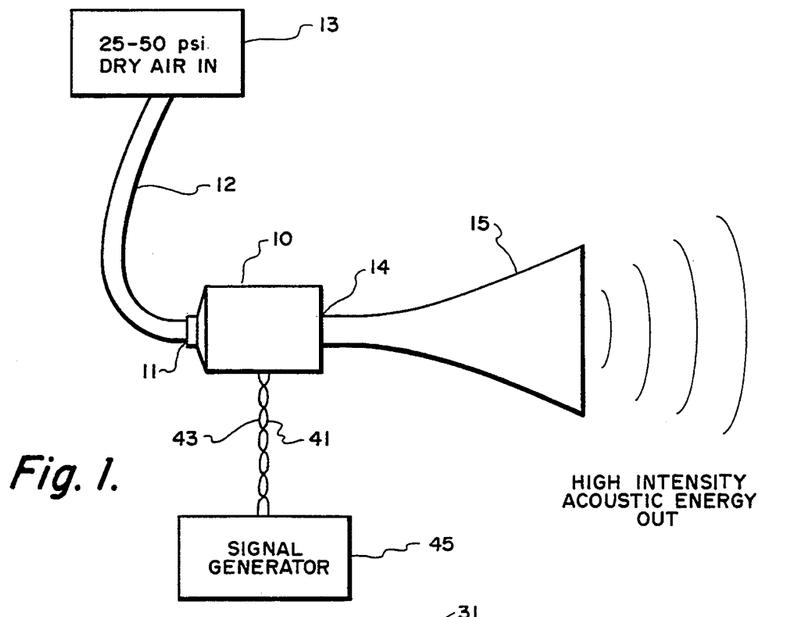
FIG. 1 is a schematic of an acoustic modulator which uses the valve mechanism of the present invention.

Referring to FIG. 1, there is shown an acoustic modulator 10 which has an inlet port 11 connected by a hose 12 to a source 13, which provides dry air to modulator 10 at 25 to 50 psi. Acoustic modulator 10, in turn, modulates the dry air from source 10 providing at its outlet port 14, which is connected to a horn 15, a high intensity acoustic output wave front.

At this time it should be noted that the acoustic modulator 10 which is using the valve mechanism of the present invention is a Model EPT-1094 modulator available from M T Ling, a subsidiary of Mechanical Technologies Incorporated, although it should be noted that the double valve mechanism of the present invention may be used with any similar, commercially available modulator which provides a modulated air flow at frequency of between about 800 hertz and about 2000 hertz.

Figure 2:
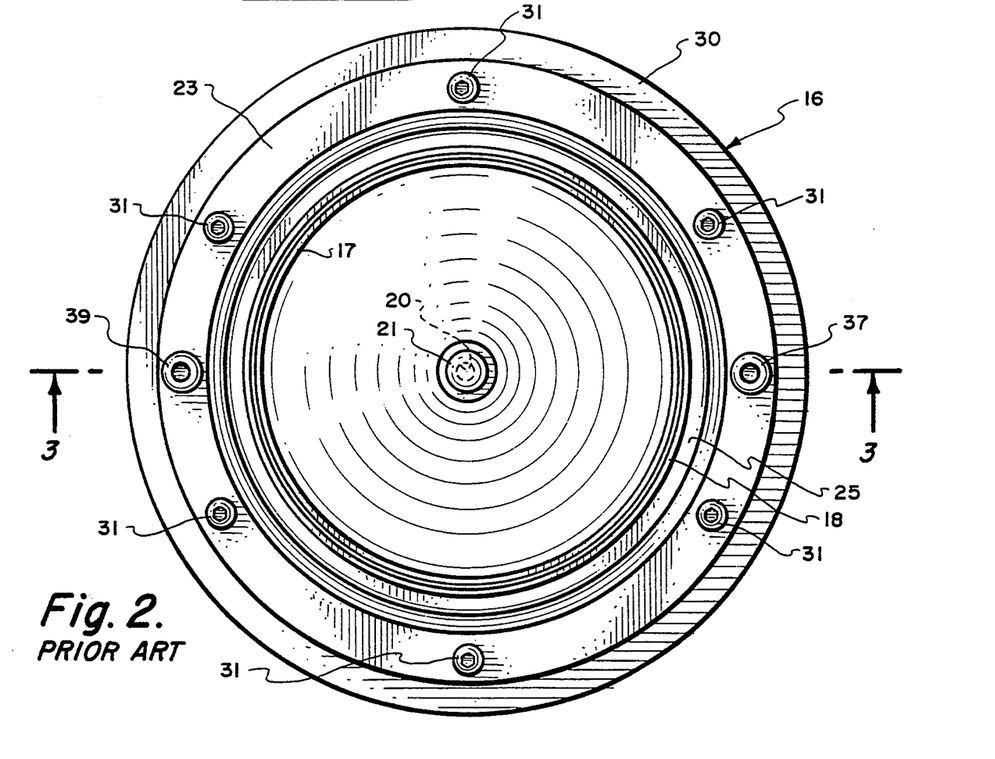
FIG. 2 is a top view of a prior art valve mechanism for the acoustic modulator of FIG. 1.
Figure 3:
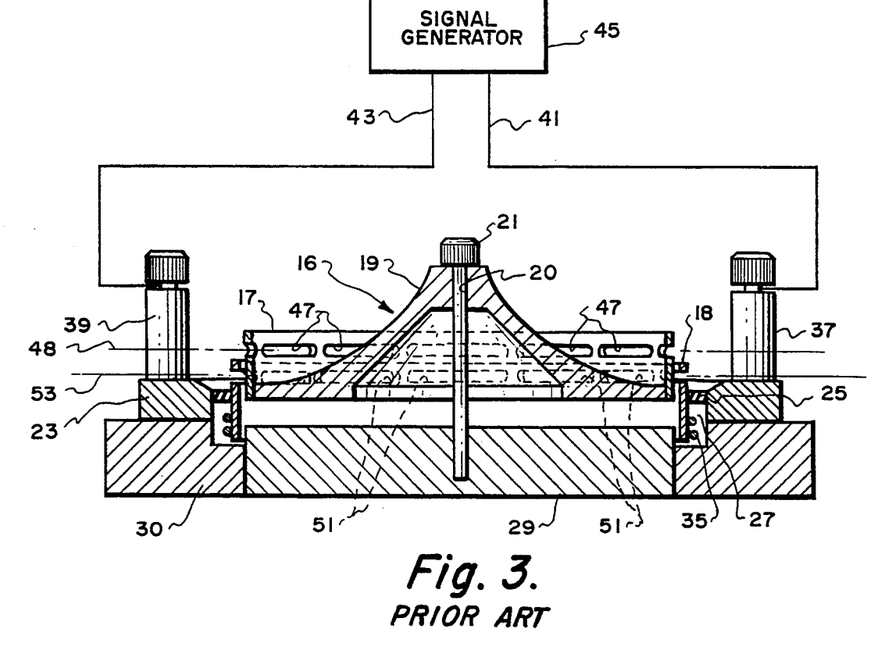
FIG. 3 is a cross sectional view taken along line 5—5 of the prior art valve mechanism of FIG. 2.

Referring first to FIGS. 1, 2 and 3, there is shown the prior art valve mechanism 16 used with acoustic modulator 10. Prior art valve mechanism 16 comprises a pair of cylindrical shaped members 17 and 18 with cylindrical shaped member 17 being positioned within cylindrical shaped member 18. Cylindrical shaped member 17 is rigidly attached to a cone shaped support member 19 which has an aperture 20 through which a mounting bolt 21 passes so as to secure cone shaped support member 19 in a fixed position within acoustic modulator 10.

Cylindrical shaped member 18 is secured to a mounting ring 23 by a highly flexible non-magnetic material 25, which allows movement of cylindrical shaped member 18 in an upward and downward direction within a gap 27. Gap 27 is, in turn, located between a circular shaped magnetized support member 29 and a ring shaped mounting member 30 which is positioned circumferentially around member 29 and is also magnetized, A plurality of mounting bolts 31 secure mounting ring 23 to mounting member 30, while mounting bolt 21 is used to secure cone shaped support member 19 to support member 29.

Wound around the outer surface and positioned near the lower end of cylindrical shaped member 18 is a drive coil 35 which has one end thereof electrically connected to a terminal 37 attached to mounting ring 23 and the opposite end thereof electrically connected to a terminal 39 attached to mounting ring 23. Terminals 37 and 39 are respectively connected by wires 41 and 43 to the first and second terminals of a signal generator 45 which generates an electrical sinusoidal signal 46, FIG. 4, having a frequency that may be varied by an operator and is preferably in the frequency range of between 800 and 1000 hertz.

Figure 4:
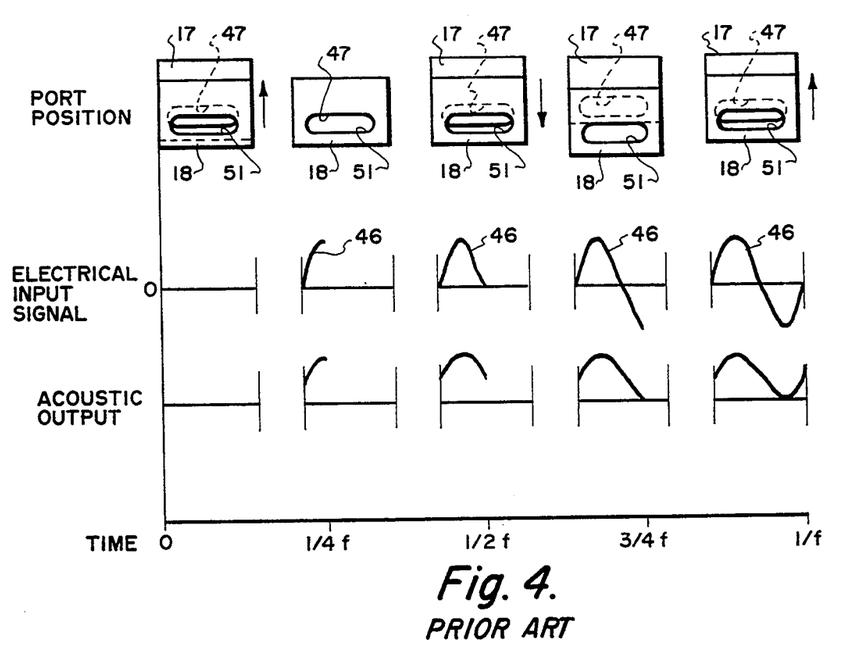
FIG. 4 is a graphical representation of the acoustic output wave front generated by the acoustic modulator of FIG. 1 utilizing the prior art valve mechanism of FIG. 2.

At this time it should be noted that a magnetic field is created within gap 27 by support member 29 (north pole of the magnetic field) and mounting member 30 (south pole of the magnetic field) so that energizing drive coil 35 with an electrical signal such as signal 46, FIG. 4, will cause movement of cylindrical shaped member 18 in an upward and then downward direction.

Referring now to FIG. 4 cylindrical shaped member 17 has a plurality of elongated ports 47 positioned in a plane 48 while cylindrical shaped member 18 has a plurality of elongated ports 51 positioned in a plane 52 such that when the ports of member 17 align with the ports of member 18 the prior art valve mechanism 16 is in the open position. Similarly, when the ports of member 17 are out of alignment with the ports of member 18 the prior art valve mechanism 16 is in the closed position.

The operation of the prior art valve mechanism will now be described by means FIGS. 1, 3 and 4.

When electrical sinusoidal input signal 46 is positive, port 51 of cylindrical shaped member 18 moves in the direction of the arrow such that port 51 of member 18 is aligned with port 47 of member 17. Valve mechanism 57 11 is now in an open position allowing air to flow through aligned port 47 and 51. When signal 46 goes negative, port 51 moves in the direction of the arrow and is now out of alignment with port 47 and valve mechanism 16 is in a closed position stopping air flow through the prior art valve mechanism.

This results in an acoustic output wave front having a frequency equivalent to the frequency of the electrical sinusoidal input signal 46. Unfortunately, since the upper limit of the operating frequency of the prior art valve mechanism is generally between 800 and 1000 hertz, the acoustic output wave front an acoustic modulator using the prior art valve mechanism will also have an upper frequency limit of between 800 and 1000 hertz which is lower the required frequency for some testing purposes.

Referring now to FIGS. 5, 6, 7 and 8, there is shown an improved valve mechanism, designated generally by the reference numeral 55 for use with acoustic modulator 10. Valve mechanism 55 comprises a pair of cylindrical shaped members 57 and 59 with member 57 being positioned inside of member 59. In the preferred embodiment cylindrical shaped member 57 has an outside diameter of 2 13/16 inches while member 59 having an outside diameter of 2⅞ inches. Each cylindrical shaped member 57 and 59 may be fabricated 0.025 inch thick aluminum or similar light weight high strength materials.

Figure 5:
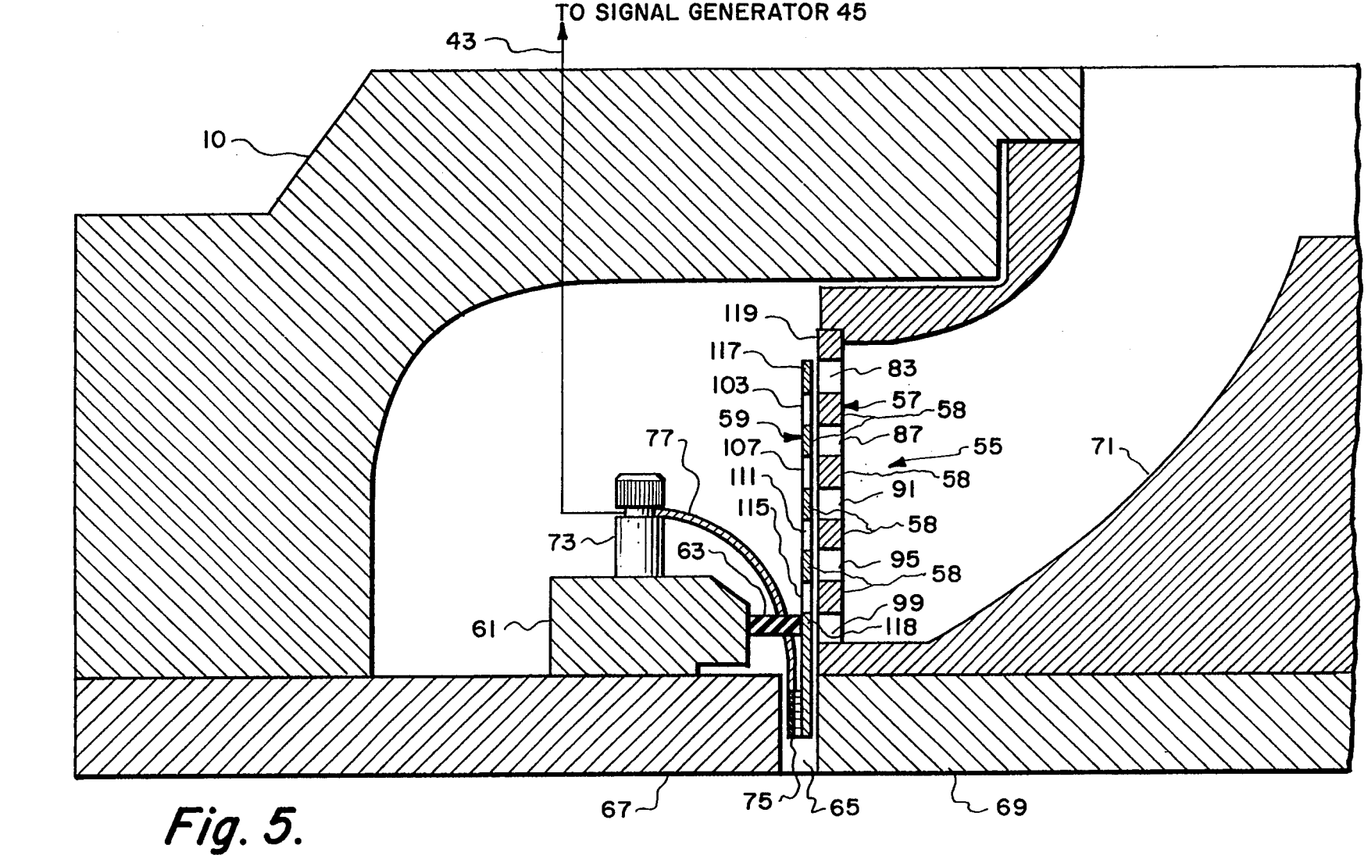
FIG. 5 is a partial cross sectional view of the valve mechanism of the present invention shown in the closed position.
Figure 6:
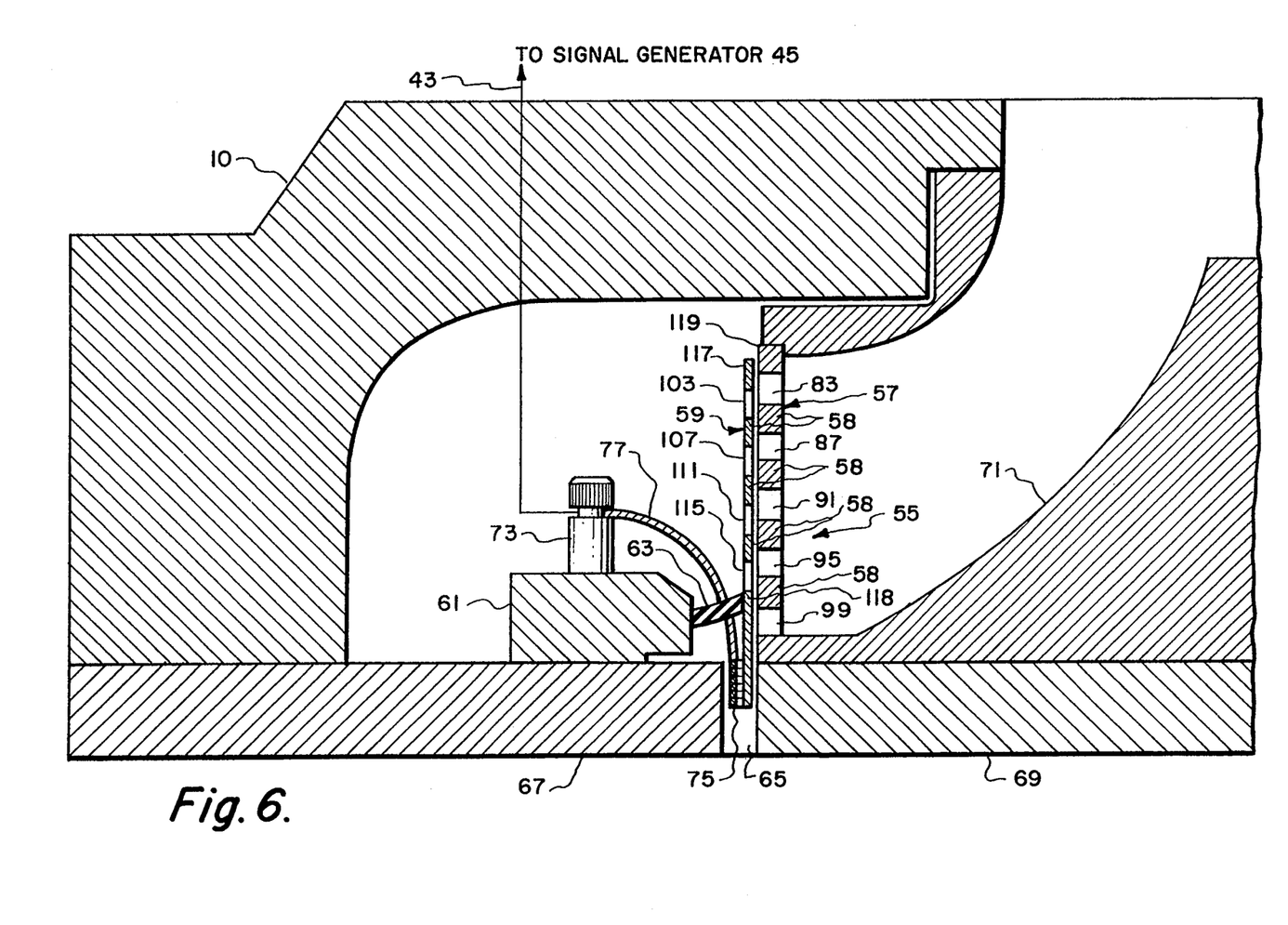
FIG. 6 is a partial cross sectional view of the valve mechanism of the present invention shown in an open position when the movable cylindrical shaped member of the valve mechanism is fully extended in an upward direction.
Figure 7:
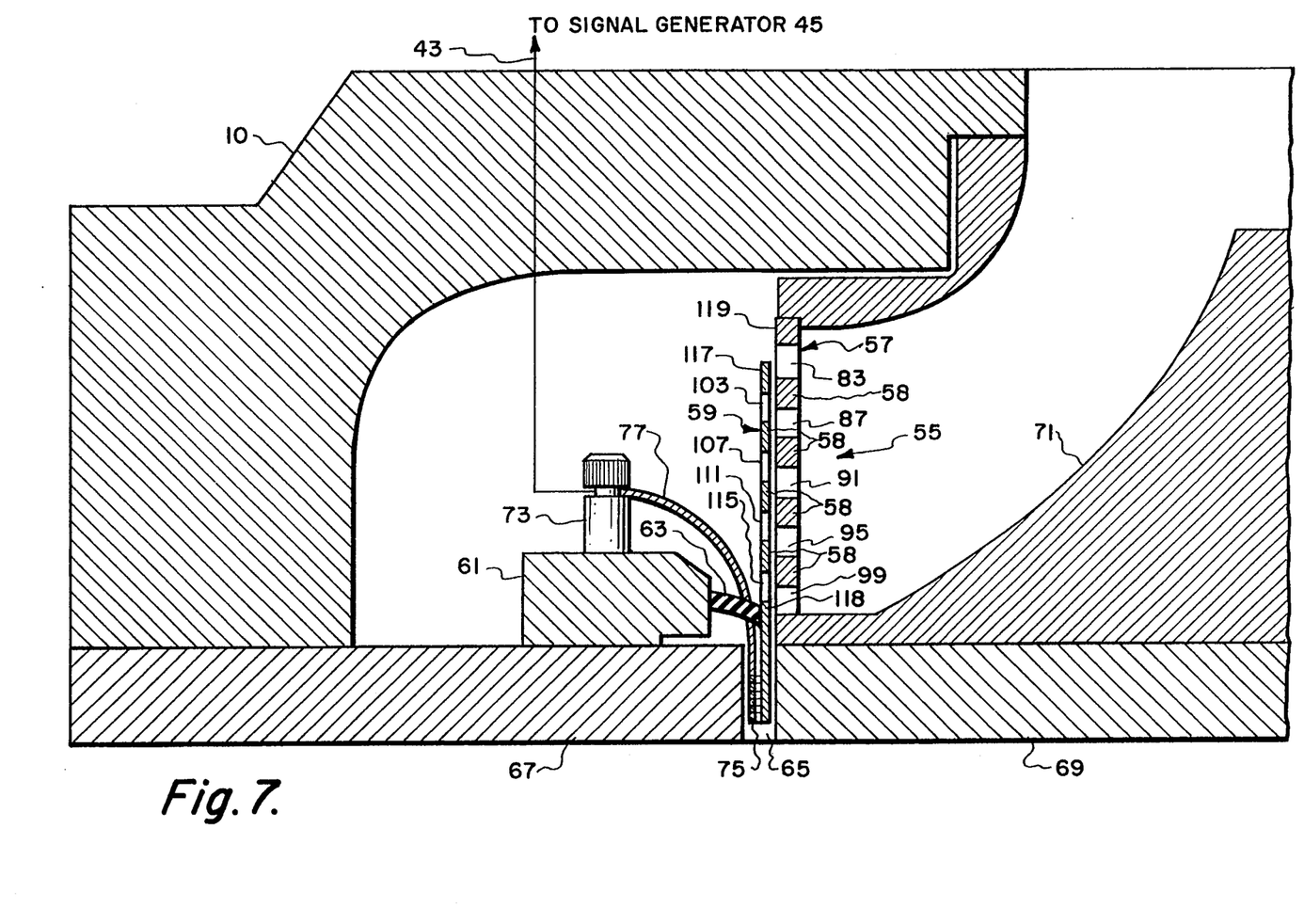
FIG. 7 is a partial cross sectional view of the valve mechanism of the present invention shown in an open position when the movable cylindrical shaped member of the valve mechanism is fully extended in a downward direction.

Cylindrical shaped member 59 is secured to a mounting ring 61 by a flexible material 63. Flexible material 63 which is a ring shaped elastomeric material strip can be any rubberized compound or elastomeric material which allows movement of member 59 in an upward and then downward direction within a gap or opening 65. Gap or opening 65 is located between a ring shaped mounting member 67 and a circular shaped support member 69. Members 67 and 69 are each permanently magnetized with each member 67 and 69 functioning as one pole of a permanent magnet so that a magnetic field is created within gap 65.

Cylindrical shaped member 57 is rigidly attached to a cone shaped support member 71 which is secured to support member 69 by a mounting bolt, not shown, so as to insure that cylindrical shaped member 57 is a fixed position within acoustic modulator 10. There is attached to mounting ring 61 a pair of electrical terminals 73 (only one of the terminals 73 is illustrated in FIGS. 5, 6 and 7) which are connected to signal generator 45, FIG. 3, by wires 41 and 43, FIG. 3. A plurality of mounting bolts, not shown, secure mounting ring 61 to mounting member 67.

Wound around the outer surface of cylindrical shaped member 59 is a drive coil 75 which may be fabricated from any electrical conductive material such as copper wire. Drive coil 75 is located near the lower end of cylindrical shaped member 59 so as to be positioned within the magnetic field generated by magnetized members 67 and 69 which are respectively the north and south of the magnetic field.

Figure 9:
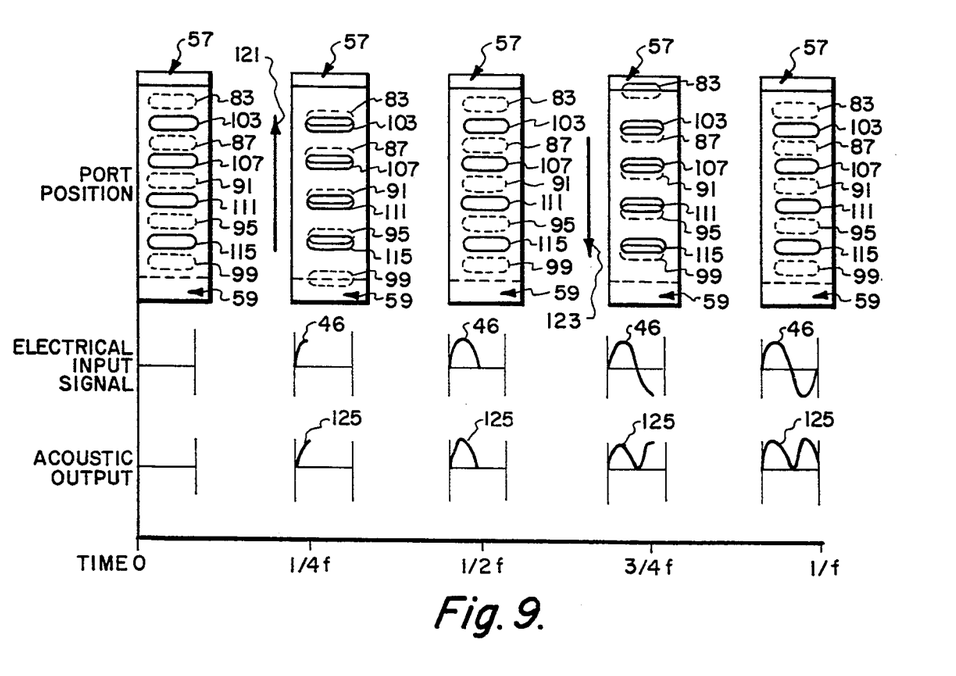
FIG. 9 is a graphical representation of the acoustic output wave front generated by the acoustic modulator of FIG. 1 utilizing the valve mechanism of the present invention.

Each end of drive coil 75 is connected to one of the electrical terminals 73 of valve mechanism 55 by a highly flexible electrical conductive strip 77 which allows for the movement of cylindrical shaped member 59 in an upward and then downward direction when drive coil 75 is excited by a signal 46, FIG. 9, provided by signal generator 45.

Figure 8:
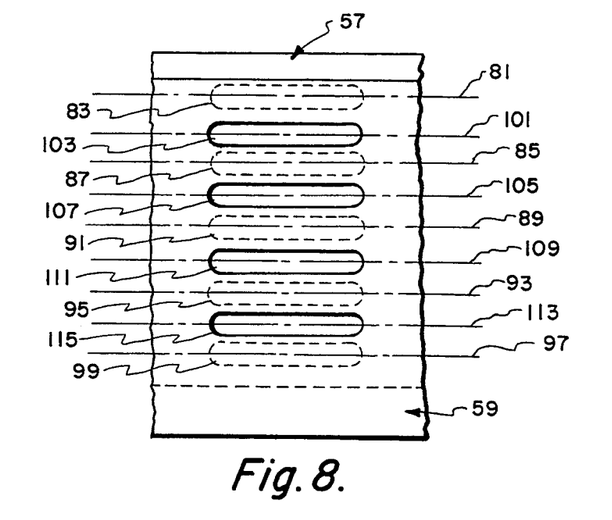
FIG. 8 is an enlarged view taken along line 5—5 of some of the elongated ports of the valve mechanism of the present invention.

Referring to FIGS. 5 and 8, with respect to cylindrical shaped member 57, there is located on a plane 81 and positioned around the circumference of member 57 twelve elongated valve ports 83, while there is located on a plane 85 and positioned around the circumference of member 57 twelve elongated valve ports 87 and there is located on a plane 89 and positioned around the circumference of member 57 twelve elongated valve ports 91. There is also located on a plane 93 and positioned around the circumference of member 57 twelve elongated valve ports 95 while there is located on a plane 97 and positioned around the circumference of member 57 twelve elongated valve ports 99.

With respect to cylindrical shaped member 59, there is located on a plane 101 and positioned around the circumference of member 59 twelve elongated valve ports 103, while there is located on a plane 105 and positioned around the circumference of member 59 twelve elongated valve ports 107. There is also located on a plane 109 and positioned around the circumference of member 59 twelve elongated valve ports 111 while there is located on a plane 113 and positioned around the circumference of member 59 twelve elongated valve ports 115.

Each of the elongated valve ports 103, 107, 111 and 115 of cylindrical shaped member 59 is approximately 11/16 of an inch in length and ⅛ of an inch in width. In a like manner each of the elongated valve ports 83, 87, 91 and 95 are approximately 11/16 of an inch in length and ⅛ of an inch in width. The elongated valve ports 99 of member 57 are approximately 11/16 of an inch in length and 3/32 of an inch in width.

It should be understood that the elongated ports of cylindrical shaped members 57 and 59 could have different dimensions as long as every port has the same length and about the same width. Thus, if ports 99 of member 57 were approximately 11/16 of an inch in length and ⅛ of an inch in width (instead of 3/16 of an inch in width), the valve mechanism of the present invention would still perform its intended function by providing an acoustic wave front 125, FIG. 9 which has a frequency twice the frequency of the sinusoidal input signal 46 when the drive current supplied to coil 35 is sufficient to cause movement of cylindrical shaped member 59 through its full range of motion.

As is best illustrated in FIG. 5, with respect to cylindrical shaped members 57 and 59 the spacing or separating lands 58 between elongated ports located on one plane to the elongated ports located on an adjacent plane is also approximately 58 of an inch. Thus, for example, the spacing or separating lands 18 between ports 103 and ports 107 of cylindrical shaped member 59 is approximately ⅛ of an inch, while the spacing or separating lands 58 between ports 111 and ports 115 of cylindrical shaped member 59 is approximately ⅛ of an inch. There is also a solid upper portion or land 117 of cylindrical shaped member 59 above ports 103 which is approximately ⅛ of inch in width and there is a solid upper portion or land 119 of cylindrical shaped member 57 above ports 83 which is approximately ⅛ of inch in width. Further, there is a solid lower portion or land 118 near the bottom of member 59 which is approximately ⅛ of an inch in width.

At this time it should be noted that the valve mechanism 55 of the present invention is similar to the prior art valve mechanism 16 with the significant change in the valve mechanism of the present invention being the design of movable cylindrical shaped member 59 and the placement of the elongated ports 103, 107, 111 and 115 within member 59. In addition, it should be noted that changes in the design of the throat structure and compression chamber of acoustic modulator 10 as well the horn flare of horn 15 would likely result in increased high frequency performance.

The operation of valve mechanism 55 will now be discussed in conjunction with FIGS. 5, 6, 7, and 9 of the drawings.

Referring first to FIGS. 5 and 9 when the electrical sinusoidal input signal 46 is at zero volts, valve mechanism 55 is in a neutral position, that is valve mechanism 55 is closed as is best illustrated in FIG. 5 and air flow through valve mechanism 55 is inhibited.

Referring to FIGS. 6 and 9 as electrical signal 46 provided by signal generator 45 goes positive drive coil 75 is excited and the magnetic field within gap 65 will cause a force to be exerted upon cylindrical shaped member 59 moving member 59 in the upward direction indicated by arrow 121. This upward movement of cylindrical shaped member 59 with respect to cylindrical shaped member 57 partially aligns ports 103 with ports 83, ports 107 with ports 87, ports 111 with ports 91 and ports 115 with ports 95 opening valve mechanism 55 thereby increasing the air flow through valve mechanism 55 until signal 46 reaches its positive going peak amplitude at which time air flow through valve mechanism 55 is maximum.

When electrical signal 46 returns to zero member 59 will return to the neutral position of FIG. 5, thereby decreasing air flow valve mechanism 55 until valve mechanism is closed at which time air flow through valve mechanism 55 is inhibited.

Referring to FIGS. 7 and 9 as electrical signal 46 provided by signal generator 45 goes negative drive coil 75 is excited and the magnetic field within gap 65 will cause a force to be exerted upon cylindrical shaped member 59 moving member 59 in the downward direction indicated by arrow 123. This downward movement of cylindrical shaped member 59 with respect to cylindrical shaped member 57 partially aligns ports 103 with ports 87, ports 107 with ports 91, ports 111 with ports 95 and ports 115 with ports 99 again opening valve mechanism 55 thereby increasing the air flow through valve mechanism 55 until signal 46 reaches its negative going peak amplitude at which time air flow through valve mechanism 55 is again maximum.

When electrical signal 46 returns to zero member 59 will return to the neutral position of FIG. 5, thereby decreasing air flow valve mechanism 55 until valve mechanism is closed at which time air flow through valve mechanism 55 is inhibited.

This results in the acoustic wave front 125 being generated by acoustic modulator 10 which has a frequency that is twice the frequency of electrical sinusoidal input signal 46. If signal 46 has a frequency of 800 hertz, the acoustic energy output signal 125 generated by acoustic modulator 10 will have a frequency of 1600 hertz. Thus, valve mechanism 55 functions as an acoustic full wave rectifier, that is valve mechanism 55 uses the negative going portion of electrical sinusoidal input signal 46 to generate the full wave acoustic rectified signal 125 of FIG. 9.

At this time it should be noted that the valve mechanism of the present invention has an upper limit operating frequency of about 1700 hertz. If it is desired to increase the operating frequency of valve mechanism 55, lighter weight materials may be used for the cylindrical shaped members 57 and 59 of the valve mechanism of the present invention and a light weight voice coil may be used as drive coil 75.

The valve mechanism of the present invention is a considerable improvement over the prior art valve mechanism illustrated in FIG. 3 in that valve mechanism 55 maintains the acoustical power output of modulator 10, FIG. 1, at the same level as prior art valve mechanism 16 while doubling the frequency of the acoustic output wave front as is best illustrated by FIG. 9. An increase in the number of slots within cylindrical shaped members 57 and 59 which are opened when member 59 moves upward as shown in FIG. 6 or downward as shown in FIG. 7, allows air flow through valve mechanism 55 to remain at the same level as through prior art valve mechanism 10.

The drive current required by valve mechanism 55 to provide the acoustic wave front of FIG. 9 is about the same as the drive current required by the prior art valve mechanism of FIG. 3. Altering the size and the placement planes of the slots within members 57 and 59 provides the enhanced performance of valve mechanism 55 without increasing the power required by valve mechanism 55 for the movement of cylindrical shaped member 59 in either an upward or downward direction. This, in turn, prevents harmonic distortion of the acoustic output wave front 125 of FIG. 9, that is, signal generator 45 driving valve mechanism 55 is not driven into clipping, the acoustic wave front is clean with only rectification induced harmonic components present.

From the foregoing it may be seen that the present invention comprises a new, unique and exceeding useful valve mechanism for an acoustic modulator. Obviously many modifications and variations of the present invention are possible in light of the above teachings. It is, therefore, to be understood that within the scope of the appended claims the invention may be practiced otherwise than as specifically described.

What is claimed is:

1. A valve mechanism for an acoustic modulator, said valve mechanism comprising:

first and second cylindrical shaped members, said first cylindrical shaped member being positioned inside of said second cylindrical shaped member;

said first cylindrical shaped member having sixty elongated valve ports therethrough, said valve ports of said first cylindrical shaped member being positioned on first, second, third, fourth and fifth planes passing through said first cylindrical shaped member, each of said first, second, third, fourth and fifth planes passing through said first cylindrical shaped member having twelve of said sixty elongated valve ports positioned thereon;

said first cylindrical shaped member having elongated lands located between said valve ports positioned on adjacent planes of said first cylindrical shaped member, each of said lands of said first cylindrical shaped member having a width of about one eighth of an inch;

said first cylindrical shaped member having an upper elongated land at a top portion of said first cylindrical shaped member, said upper elongated land at the top portion of said first cylindrical shaped member having a width of about one eighth of an inch;

said second cylindrical shaped member having forty eight elongated valve ports therethrough, said valve ports of said second cylindrical shaped member being positioned on first, second, third, and fourth planes passing through said second cylindrical shaped member, each of said first, second, third, and fourth planes passing through said second cylindrical shaped member having twelve of said forty eight elongated valve ports positioned thereon;

said second cylindrical shaped member having elongated lands located between said valve ports positioned on adjacent planes of said second cylindrical shaped member, each of said lands of said second cylindrical shaped member having a width of about one eighth of an inch;

said second cylindrical shaped member having an upper elongated land at a top portion of said first cylindrical shaped member and a lower elongated land at a bottom portion of said second cylindrical shaped member, said upper elongated land at the top portion of said second cylindrical shaped member and said lower elongated land at the bottom portion of said second cylindrical shaped member each having a width of about one eighth of an inch;

each of said elongated valve ports of said first and second cylindrical shaped members having a length of about eleven sixteenths of an inch and a width of about one eighth of an inch;

first and second support members, said first cylindrical shaped member being fixedly attached to said first support member;

a ring shaped elastomeric material strip connecting said second cylindrical shaped member to said second support member, said ring shaped elastomeric material strip allowing a first movement of said second cylindrical shaped member in an upward direction from a neutral position followed by a second movement of said second cylindrical shaped member in a downward direction from said neutral position;

a drive coil wound around the outer surface near the lower end of said second cylindrical shaped member;

means for generating a magnetic field, said magnetic field generating means having a gap therein, said magnetic field being generated within said gap;

said drive coil being positioned within the gap of said magnetic field generating means, said drive coil responsive to an electrical sinusoidal input signal of a predetermined frequency supplied to said drive coil moving said second cylindrical shaped member in said upward direction from said neutral position and then moving said second cylindrical shaped member in said downward direction from said neutral position;

each of the valve ports of said first cylindrical shaped member being aligned with one of the lands of said second cylindrical shaped member and each of the valve ports of said second cylindrical shaped member being aligned with one of the lands of said first cylindrical shaped member when said second cylindrical shaped member is in said neutral position;

each of the valve ports of said second cylindrical shaped member being aligned with one of the valve ports of said first cylindrical shaped member positioned on said first, second, third and fourth planes of said first cylindrical shaped member when said first movement of said second cylindrical shaped member occurs;

each of the valve ports of said second cylindrical shaped member being aligned with one of the valve ports of said first cylindrical shaped member positioned on said second, third, fourth and fifth planes of said first cylindrical shaped member when said second movement of said second cylindrical shaped member occurs;

said neutral position of said second cylindrical shaped member prohibiting air flow through said valve mechanism, said first and second movements of said second cylindrical shaped member allowing said air flow through said valve mechanism;

said valve mechanism providing a modulated acoustic wave front having a frequency in the range of about sixteen hundred hertz to about two thousand hertz, the frequency of said acoustic wave front being twice the predetermined frequency of said electrical sinusoidal input signal.

2. The valve mechanism of claim 1 further comprising a signal generator connected to said drive coil for supplying said electrical sinusoidal input signal to said drive coil.

* * * * *